United States Patent [19]

Baluch et al.

[11] Patent Number: 5,382,299
[45] Date of Patent: Jan. 17, 1995

[54] SOLDERING FLUX

[75] Inventors: Dosten Baluch, Wembley; Anthony E. Ingham, Chiswick, both of United Kingdom

[73] Assignee: Cookson Group PLC, London, United Kingdom

[21] Appl. No.: 187,738

[22] Filed: Jan. 28, 1994

[30] Foreign Application Priority Data

Feb. 1, 1993 [GB] United Kingdom ............... 9301912

[51] Int. Cl.⁶ .............................................. B23K 35/34
[52] U.S. Cl. .......................................... 148/23; 148/24
[58] Field of Search ................................. 148/23-25

[56] References Cited

U.S. PATENT DOCUMENTS 2,880,126  3/1959  Jordan et al. ...................... 148/23
5,094,928  12/1991  Sanji ................................... 148/23

FOREIGN PATENT DOCUMENTS 1553069  9/1979  United Kingdom .

OTHER PUBLICATIONS

International Publication No. WO 86/00844, dated Feb. 13, 1986 to A. Biverstedt.

*Primary Examiner*—Peter D. Rosenberg
*Attorney, Agent, or Firm*—Watson, Cole, Grindle & Watson

[57] ABSTRACT

A soldering flux composition includes an aqueous solution containing as component (A) a compound selected from (i) hydrohalides and hydrophosphates of guanidine and substituted guanidines, (ii) hydrohalides and hydrophosphates of a five-membered nitrogen containing heterocyclic amine of the formula $$C_xN_yH_3$$

in which x is 1 or 2 and y is 4 or 5, and mixtures of (i) and (ii) and as component (B) at least one compound selected from hydrohalides and hydrophosphates of aliphatic amines selected from aliphatic monoamines of formula $CH_3(CH_2)_nNR_2$ and aliphatic diamines of formula $R_2N(CH_2)_mNR_2$ in which n is 0 to 10, m is 5 to 10 and R is hydrogen, methyl, ethyl, propyl or butyl, the components (A) and (B) being present in the relative proportions of 25 to 100% by weight of (A) and 75 to 0% of (B).

14 Claims, No Drawings

SOLDERING FLUX

BACKGROUND OF THE INVENTION

This invention is invention is concerned with soldering fluxes particularly with such fluxes which are useful for a variety of soldering applications, such as soldering the radiators of motor vehicles and heat exchanger assemblies.

Various soldering procedures are used in the manufacture of car radiators and heat exchanger assemblies. One of these is the baking procedure which involves coating tubes with solder, clamping an assembly of the tubes and of other radiator components in a jig, spraying with flux or dipping the assembly in flux and baking the assembly in an oven. This procedure requires the assembly to remain in the oven at elevated temperature usually for several minutes. The oven temperature may be anything from 250° to 470° C. but is more likely to be in the range 280° to 400° C. During this procedure the solder will melt and flow into the crevices in the joints of the assembly thereby providing the necessary bonding. Another soldering process used in these industries is end-dipping and this also involves exposure to high temperature.

The flux used in these soldering processes must therefore have a sufficiently long high temperature life to ensure that it will provide sufficient protection to the surfaces to be joined until the radiator has attained a temperature sufficient to melt the solder and thereby permit bonding. Other desirable properties of fluxes are that they should produce low levels of char and residue and of course have a good fluxing efficiency.

Examples of fluxes which have previously been developed for such uses are described in British Patents Nos. 1517116 and 1553069. The earlier of these discloses a soldering flux which comprises an aqueous solution containing a mixture of 25 to 75% by weight of a hydrobromide of an aliphatic hydroxyamine and 75 to 25% by weight of a hydrobromide of an aliphatic amine. The latter is a development of this which describes and claims a flux which comprises an aqueous solution containing a mixture of diethanolamine hydrobromide and ethylamine hydrobromide together with ammonium bromide.

After soldering using these fluxes, the used flux will contain an accumulation of metal ions including copper II and zinc II ions. The used flux is usually chemically treated with lime or sodium hydroxide until a pH of about 9 is reached, which causes the metal ions to precipitate as insoluble hydroxides. The metal free waste is then discharged to drain. The treatment with alkali (e.g. lime) is carried out to remove metal ions for environmental reasons.

The applicant has now found that when used flux from commercial fluxes such as those described above is made alkaline a significant proportion of metal ions may be retained in solution rather than precipitated out as insoluble hydroxide. This has been found to occur with fluxes containing aliphatic amines of the type $R_2N(CR_2)_nNR_2$ or $R_2N(CR_2)_nOH$ in which n is 2 to 4 and R is hydrogen, methyl or ethyl. This presents an environmental problem because copper and zinc ions which were supposed to have been removed have not been and are therefore being discharged to drain.

SUMMARY OF THE INVENTION

The present invention provides a new soldering flux with good soldering properties and which reduces or obviates the aforementioned environmental problem.

In accordance with the present invention there provided a soldering flux which comprises an aqueous solution containing as component (A)(i) one or more hydrohalides or hydrophosphates of guanidine or a substituted guanidine, or (ii) one or more hydrohalides or hydrophosphates of a five-membered nitrogen containing heterocyclic amine of the formula:

$$C_xN_yH_3$$

in which x is 1 or 2 and y is 4 or 5, or mixtures of (i) and (ii) and as component (B) one or more hydrohalides or hydrophosphates of aliphatic amines selected from aliphatic monoamines of formula $CH_3(CH_2)_nNR_2$ and aliphatic diamines of formula $R_2N(CH_2)_mNR_2$ in which n is 0 to 10, m is 5 to 10 and R is hydrogen, methyl, ethyl, propyl or butyl, said components (A) and (B) being present in the relative proportions of 25 to 100% by weight of (A) and 75 to 0% of (B).

Preferably component (A)(i) will comprise a hydrobromide of guanidine, for example guanidine hydrobromide, cyanoguanidine hydrobromide or a mixture thereof, although other substituted guanidine hydrobromides may be used. Preferably component (A) (ii) will comprise 5-aminotetrazole hydrobromide or 3-amino-1,2,4-triazole hydrobromide. If component (B) is present it will preferably comprise a hydrobromide, for example ethylamine hydrobromide, 1,6-diaminohexane hydrobromide, 1,5-diaminopentane hydrobromide or a mixture thereof, although other aliphatic amine hydrohalides falling within the definition given above may be employed.

The flux of the present invention has good fluxing efficiency, a long high temperature life and produces low char and low residues. Furthermore, analysis shows that after use and subsequent treatment with lime the flux according to the present invention does not retain any significant quantities of copper II or zinc II ions, those ions are precipitated as the insoluble hydroxides.

While the applicant does not wish to be bound by theory, it is thought that this favourable result occurs because the metal ions cannot form stable chelate complexes with the organic compounds due to unfavourable ring size or the instability resulting from the donation of electron pair(s) to a metal ion. With the present invention, in the case of guanidine or 5-aminotetrazole, chelation does not occur because any chelate complex with a metal ion would have to have a ring size of less than 5 atoms and would therefore suffer from steric strain and be unstable. In the case of 3-amino-1,2,4-triazole, chelation is not possible because of the unsuitable stereochemistry of the donor sites on the rigid five-member heterocyclic ring. Cyanoguanidine acts as a monodentate ligand due to the instability resulting from bidentate coordination. In the case of 1,6-diaminohexane, a ring of more than 6 atoms would be formed which would be strained and therefore also not particularly stable. Ethylamine has only one electron donor site and so chelation cannot occur.

In the case of the prior art, on the other hand, copper II and zinc II ions can form soluble chelate complexes with aliphatic amines such as diethanol amine and therefore do not precipitate out when the lime is added.

An ammonium halide or phosphate may be included in the flux in an amount of up to 400% by weight, preferably up to 150% by weight, and more preferably, 20 to 75% by weight of the total weight of components (A) and (B).

The flux may further include a hydrohalic acid or phosphoric acid or a mixture thereof in an amount of up to 800% by weight of the total weight of the components (A) and (B). The hydrohalides or hydrophosphates used in the flux can be made by adding a hydrohalic acid or phosphoric acid to guanidine carbonate, a substituted guanidine, a heterocyclic amine of the formula:

$C_xN_yH_3$ in which x is 1 or 2 and y is 4 or 5, or the relevant free amine. Often more hydrohalic acid or phosphoric acid will be added than is stoichiometrically necessary to react with the carbonate or substituted guanidine or the relevant free amine and so some free hydrohalic or phosphoric acid will be present.

Soldering fluxes of the kind described herein are usually made up in concentrated form for sale to customers. They will then be diluted with water prior to use unless they are needed for a particularly difficult fluxing job in which case they might be applied in concentrated form. Typically a soldering flux in concentrated form for dilution with water prior to use will comprise from 2 to 40 grams of component (A) per 100 ml of water. Normally, after dilution to a strength ready for use, the flux will typically contain 0.1 to 1.5 grams of component (A) per 100 ml of water.

The compositions of the present invention may also contain one or more wetting agents and/or corrosion inhibitors. Examples of suitable corrosion inhibitors are benzotriazole and imidazole.

The invention includes within its scope a method of making a soldering flux as described above which comprises the steps of adding guanidine carbonate, a substituted guanidine, or a heterocyclic amine of the formula:

$C_xN_yH_3$ where x is 1 or 2 and y is 4 or 5, and/or an aliphatic amine selected from aliphatic monoamines of formula $CH_3(CH_2)_nNR_2$ and aliphatic diamines of formula $R_2N(CH_2)_mNR_2$ in which n is 0 to 10, m is 5 to 10 and R is hydrogen, methyl, ethyl, propyl or butyl, to an aqueous hydrohalic acid or phosphoric acid, then adding aqueous ammonia to the mixture and thereafter adding water to produce the desired concentration.

The flux compositions of the present invention may be used in various soldering applications and find particular application in the soldering of radiators or heat exchangers using techniques which are well known in the art.

Radiators or heat exchangers which may be soldered using the fluxes of the present invention are typically made from copper/brass, for example radiator tubes being made of brass and the radiator fins being made of copper, preferably copper containing small amounts of arsenic to prevent annealing on heating. These radiator components may be soldered using a range of tin/lead alloys, an Sn30:Pb70 alloy being particularly preferred.

The following are Examples of fluxes according to the invention

EXAMPLE 1

| | |
|---|---|
| Guanidine hydrobromide | 5.7 g |
| Ammonium bromide | 8.0 g |
| Wetting agent | 0.4 g |
| Water, to provide total volume of | 100 ml |

EXAMPLE 2

| | |
|---|---|
| Guanidine hydrobromide | 5.7 g |
| Ethylamine hydrobromide | 5.1 g |
| Ammonium bromide | 8.0 g |
| Wetting agent | 0.4 g |
| Water, to provide total volume of | 100 ml |

EXAMPLE 3

| | |
|---|---|
| Cyanoguanidine hydrobromide | 3.4 g |
| Ammonium bromide | 8.0 g |
| Wetting agent | 0.4 g |
| Water, to provide total volume of | 100 ml |

EXAMPLE 4

| | |
|---|---|
| Cyanoguanidine hydrobromide | 3.4 g |
| Ethylamine hydrobromide | 5.1 g |
| Ammonium bromide | 8.0 g |
| Wetting agent | 0.4 g |
| Water, to provide total volume of | 100 ml |

EXAMPLE 5

| | |
|---|---|
| Guanidine hydrochoride | 5.0 g |
| Ethylamine hydrochloride | 7.0 g |
| Ammonium chloride | 2.2 g |
| Wetting agent | 0.5 g |
| Water, to provide total volume of | 100 ml |

EXAMPLE 6

| | |
|---|---|
| Guanidine hydrochloride | 6.0 g |
| Ammonium chloride | 4.0 g |
| Wetting agent | 0.5 g |
| Water, to provide total volume of | 100 ml |

EXAMPLE 7

| | |
|---|---|
| 5-Aminotetrazole hydrobromide | 7.5 g |
| Ethylamine hydrobromide | 10.0 g |
| Ammonium bromide | 5.0 g |
| Wetting agent | 0.5 g |
| Water, to provide total volume of | 100 ml |

EXAMPLE 8

| | |
|---|---|
| 5-Aminotetrazole hydrobromide | 7.0 g |
| Ammonium bromide | 6.0 g |
| Wetting agent | 0.8 g |

EXAMPLE 9

| | |
|---|---|
| 3-Amino-1,2,4-triazole hydrobromide | 8.0 g |
| Ethylamine hydrobromide | 10.0 g |
| Ammonium bromide | 5.0 g |
| Wetting agent | 0.8 g |
| Water, to provide total volume of | 100 ml |

EXAMPLE 10

| | |
|---|---|
| 3-Amino-1,2,4-triazole hydrobromide | 6.0 g |
| Ammonium bromide | 8.0 g |
| Wetting agent | 0.8 g |
| Water, to provide total volume of | 100 ml |

EXAMPLE 11

| | |
|---|---|
| 5-Aminotetrazole hydrochloride | 6.0 g |
| Ethylamine hydrochloride | 7.0 g |
| Ammonium chloride | 2.0 g |
| Wetting agent | 0.7 g |
| Water, to provide total volume of | 100 ml |

EXAMPLE 12

| | |
|---|---|
| 3-Amino-1,2,4-triazole hydrochloride | 5.0 g |
| Ammonium chloride | 4.0 g |
| Wetting agent | 0.5 g |
| Water, to provide total volume of | 100 ml |

EXAMPLE 13

| | |
|---|---|
| Guanidine hydrobromide | 5.7 g |
| Ethylamine hydrobromide | 4.5 g |
| Imidazole hydrobromide | 3.0 g |
| Wetting agent | 1.0 g |
| Water, to provide total volume of | 100 ml |

EXAMPLE 14

| | |
|---|---|
| Guanidine trihydrophosphate | 4.5 g |
| Ethylamine trihydrophosphate | 3.6 g |
| Ammonium dihydrogenphosphate | 1.0 g |
| Wetting agent | 1.0 g |
| Water, to provide total volume of | 100 ml |

EXAMPLE 15

| | |
|---|---|
| Guanidine trihydrophosphate | 3.5 g |
| Ethylamine hydrobromide | 7.0 g |
| Ammonium bromide | 3.0 g |
| Wetting agent | 1.0 g |
| Water, to provide total volume of | 100 ml |

Each of the above compositions also contains the relevant free hydrohalic acid, or phosphoric acid, in an amount such as to provide the final composition with a pH of below 2.0.

The above are flux concentrates, which may be used as such in difficult soldering conditions, but will normally be diluted by the user with up to 20 times their volume of water according to the conditions of use.

All of these fluxes have good fluxing efficiency, a long high temperature life, produce low levels of char and low flux residues and do not retain significant amounts of copper or zinc under alkaline conditions of pH about 9.

Such fluxes will normally be made up by adding guanidine carbonate, cyanoguanidine, or a heterocyclic amine of the formula:

$$C_xN_yH_3$$

in which x is 1 or 2 and y is 4 or 5, and ethylamine as appropriate, to an aqueous hydrohalic acid or phosphoric acid. Aqueous ammonia and a wetting agent and corrosion inhibitor will then be added, followed by water to produce the desired concentration. A specific example is given below by way of illustration.

EXAMPLE 16

| Compound | Concentration g/l |
|---|---|
| HBr (48% solution in water) | 512.0 |
| NH$_3$ (aq) (0.88 sp. grav.) | 32.0 |
| Guanidine carbonate | 36.0 |
| Non-ionic surfactant | 5.0 |
| water to provide total volume of | 1 liter |

Procedure

Guanidine carbonate is added slowly to hydrobromic acid followed by NH$_3$(aq) and the non-ionic surfactant. Total volume is then adjusted to 1 liter by adding water.

EXAMPLE 17

Hydrobromic acid (48%, 584.1 g) was weighed into a container and diluted with water (100 ml). Guanidine carbonate (67.6 g) was added portionwise and the mixture stirred until effervescence ceased. Ethylamine (70% solution, 71.8 g) was added with stirring, followed by ammonia (30% solution, 23.23 g) and the addition of non-ionic surfactants (7 g). The volume was then made upto 1 liter with water.

EXAMPLE 18

Hydrobromic acid (48% solution, 394 g) was weighed into a container and diluted with water (100 ml). Guanidine carbonate (11 g) was added portionwise and stirred until effervescence ceased. Ammonia (30% solution, 34.80 g) was then added, followed by the addition of non-ionic surfactants (7 g). The volume was then made upto 1 liter with water.

EXAMPLE 19

A copper-brass radiator core pretinned with a tin/lead alloy (Sn30:Pb70) was assembled ready for soldering. The various parts to be joined were coated with the flux of Example 17 in the form of a diluted composition comprising 1 part flux to 9 parts of water by immersion or spraying. The fluxed radiator core was then loaded into a baking oven. The temperature reached 370° C. within 2% to 3 minutes. On exit from the oven the tube to fin joints of the radiator had been successfully made.

EXAMPLE 20

A radiator end plate was soldered to the tubes of a radiator by the following method. The end plate and the tube ends were each coated with the flux of Example 18 in the form of a diluted composition comprising 1 part to 2 parts of water by immersion or spraying.

The fluxed assembly was then placed onto a molten solder (Sn30:Pb70) weir such that the solder contacted the tube ends and plate plungings so that a capillary joint was made. The solder temperature was 470° C.

We claim:

1. A soldering flux composition which comprises an aqueous solution containing as component (A) a compound selected from the group consisting of (i) hydrohalides and hydrophosphates of guanidine and substituted guanidines, (ii) hydrohalides and hydrophosphates of a five-membered nitrogen containing heterocyclic amine of the formula $$C_xN_yH_3$$

in which x is 1 or 2 and y is 4 or 5, and mixtures of (i) and (ii) and as component (B) at least one compound selected from the group consisting of hydrohalides and hydrophosphates of aliphatic amines selected from aliphatic monoamines of formula $CH_3(CH_2)_nNR_2$ and aliphatic diamines of formula $R_2N(CH_2)_mNR_2$ in which n is 0 to 10, m is 5 to 10 and R is hydrogen, methyl, ethyl, propyl or butyl, said components (A) and (B) being present in the relative proportions of 25 to 100% by weight of (A) and 75 to 0% of (B).

2. A flux according to claim 1 which further includes a component selected from an ammonium halide and ammonium phosphate in an amount of up to 400% by weight of the total weight of components (A) and (B).

3. A flux according to claim 1 which further includes a component selected from an ammonium halide and ammonium phosphate in an amount of up to 150% by weight of the total weight of components (A) and (b).

4. A flux according to claim 1 in which component (A)(i) is selected from the group consisting of guanidine hydrobromide, cyanoguanidine hydrobromide and a mixture thereof.

5. A flux according to claims 1 in which component (A)(ii) is selected from the group consisting of 5-aminotetrazole hydrobromide and 3-amino-1,2,4-triazole hydrobromide.

6. A flux according to claim 1 in which component (B) is selected from the group consisting of ethylamine hydrobromide, 1-6-diaminohexane hydrobromide, 1,5-diaminopentane hydrobromide and a mixture thereof.

7. A flux according to claim 1 which further includes an acid selected from the group consisting of a hydrohalic acid, phosphoric acid and a mixture thereof in an amount of up to 800% by weight of the total weight of components (A) and (B).

8. A flux according to claim 1 in concentrated form for dilution with water prior to use which comprises 2 to 40 g of component (A) per 100 ml of water.

9. A flux according to claim 1 in a strength ready for use which contains 0.1 to 1.5 g component (A) per 100 ml of water.

10. A flux according to claim 1 which additionally includes therein an agent selected from a corrosion inhibitor and a wetting agent.

11. A method of making a soldering flux which comprises the steps of adding at least one of guanidine carbonate, a substituted guanidine, a heterocyclic amine of the formula:

$$C_xN_yH_3$$

where x is 1 or 2 and y is 4 or 5, and an aliphatic amine selected from aliphatic monoamines of formula $CH_3(CH_2)_nNR_2$ and aliphatic diamines of formula $R_2N(CR_2)_mNR_2$ in which n is 0 to 10, m is 5 to 10 and R is hydrogen, methyl, ethyl, propyl or butyl to an aqueous hydrohalic acid or phosphoric acid, then adding aqueous ammonia to the mixture and thereafter adding water to produce a desired concentration.

12. An article which comprises a solder derived from a soldering flux composition comprising an aqueous solution containing as component (A) a compound selected from the group consisting of (1) hydrohalides and hydrophosphates of guanidine and substituted guanidines, (ii) hydrohalides and hydrophosphates of a five-membered nitrogen containing heterocyclic amine of the formula $$C_xN_yH_3$$

in which x is 1 or 2 and y is 4 or 5, and mixtures of (i) and (ii) and as component (B) at least one compound selected from the group consisting of hydrohalides and hydrophosphates of aliphatic amines selected from aliphatic monoamines of formula $CH_3(CH_2)_nNR_2$ and aliphatic diamines of formula $R_2N(CR_2)_mNR_2$ in which n is 0 to 10, m is 5 to 10 and R is hydrogen, methyl, ethyl, propyl or butyl, said components (A) and (B) being present in the relative proportions of 25 to 100% by weight of (A) and 75 to 0% of (B).

13. An article according to claim 12, consisting of a radiator.

14. An article according to claim 12, consisting of a heat exchanger.

* * * * *